United States Patent [19]

Murayama

[11] Patent Number: 5,833,155
[45] Date of Patent: Nov. 10, 1998

[54] DOUBLE-BEARING FISHING REEL WITH A LEVEL WINDING DEVICE

[75] Inventor: Tomohiro Murayama, Tokyo, Japan

[73] Assignee: Daiwa Seiko, Inc., Tokyo, Japan

[21] Appl. No.: 752,226

[22] Filed: Nov. 19, 1996

[30] Foreign Application Priority Data

Nov. 20, 1995 [JP] Japan .................................. 7-301504

[51] Int. Cl.⁶ .............................................. A01K 89/015
[52] U.S. Cl. ........................ 242/279; 242/277; 242/310
[58] Field of Search ................................. 242/277, 278, 242/279, 282

[56] References Cited

U.S. PATENT DOCUMENTS

| | | | |
|---|---|---|---|
| D. 311,051 | 10/1990 | Peterson | D22/141 |
| 336,092 | 2/1886 | Crandal et al. | |
| D. 351,451 | 10/1994 | Storz | D22/140 |
| 401,049 | 4/1889 | Moller et al. | 242/281 |
| 1,438,007 | 12/1922 | Welch | 242/277 |
| 1,448,786 | 3/1923 | Breen | |
| 1,507,404 | 9/1924 | Welch | 242/277 |
| 1,635,629 | 7/1927 | Marcy | |
| 2,263,836 | 11/1941 | Balz et al. | 242/279 |
| 2,377,996 | 6/1945 | Coleman | 242/278 |
| 2,461,884 | 2/1949 | Elsinger | 242/278 |
| 2,478,111 | 8/1949 | Kilian | 242/279 |
| 2,609,161 | 9/1952 | Guhlin et al. | |
| 2,610,809 | 9/1952 | Breedlove | |
| 2,641,417 | 6/1953 | Kinsey | |
| 2,641,418 | 6/1953 | Miller | |
| 2,646,939 | 7/1953 | Hirsch | |
| 3,612,437 | 10/1971 | Allebach | 242/268 |
| 4,345,726 | 8/1982 | Noda | |
| 4,512,536 | 4/1985 | Sato | |
| 4,775,113 | 10/1988 | Emura et al. | 242/279 |
| 4,779,819 | 10/1988 | Emura et al. | 242/279 |
| 5,330,130 | 7/1994 | Sakaguchi | 242/261 |
| 5,350,133 | 9/1994 | Morimoto | 242/261 |

FOREIGN PATENT DOCUMENTS

| | | |
|---|---|---|
| 57-14605 | 3/1982 | Japan . |
| 57-22541 | 5/1982 | Japan . |
| 59-15896 | 5/1984 | Japan . |
| 1-44062 | 12/1989 | Japan . |
| 3-61873 | 6/1991 | Japan . |
| 496163 | 11/1938 | United Kingdom . |

*Primary Examiner*—Katherine Matecki
*Attorney, Agent, or Firm*—Sughrue, Mion, Zinn, Macpeak & Seas, PLLC

[57] ABSTRACT

A double bearing fishing reel includes: a reel body; and a level winding device adapted to wind a fishing line parallel on a spool which is rotatably supported between the right and left side boards of the reel body. In the fishing reel, the traverse shaft of the level winding device which is adapted to reciprocate a fishing line guide body of the level winding device right and left, and is turned in association with a handle is provided in the reel body together with the handle shaft secured to the handle in such a manner that it is located at the rear of the spool. The double bearing fishing reel is high in operability.

8 Claims, 2 Drawing Sheets

DOUBLE-BEARING FISHING REEL WITH A LEVEL WINDING DEVICE

BACKGROUND OF THE INVENTION

This invention relates to a double-bearing type fishing reel.

A double-bearing type fishing reel has been disclosed, for instance, by Japanese Utility Patent Publication No. 22541/1982. The conventional fishing reel has a level winding device which is to parallelly and uniformly windy fishing line on a spool which is rotatably supported between the side boards of a reel body. As is seen from the above-described conventional double-bearing type fishing reel, in an ordinary double-bearing type fishing reel a winding handle is positioned in front of the spool on which the fishing line is wound, and a level winding device is provided in front of the handle. In other words, a handle drive shaft is located in front of the spool shaft, and the drive shaft (or traverse shaft) of the level winding device is located in front of the handle drive shaft.

As was described above, in the conventional double-bearing type fishing reel, the handle shaft is positioned in front of the spool shaft, and the traverse shaft of the level winding device is arranged in front of the handle shaft. Hence, when the angler turns the handle with his one hand while holding the reel body with his other hand, the handle is located away from the body of the angler, so that he cannot hold his arm tight, and therefore he cannot perform the fishing line winding operation stably.

In addition, because of the above-described arrangement, the reel body is unavoidably long in a front-to-rear direction, which makes it rather difficult for the angler to hold the reel body stably. In addition, the portion of the reel body which is located before the spool is long; that is, the reel body is bulky. Hence, it is rather difficult to smoothly perform the fishing line winding operation that the fishing line is wound while being tensioned in front of the reel body by putting it between the thumb and the index finger.

SUMMARY OF THE INVENTION

In view of the foregoing, an object of the invention is to provide a double-bearing type fishing reel which is high in operability.

The foregoing object has been achieved by the provision of a double-bearing type fishing reel with a level winding device which is adapted to wind a fishing line parallel on a spool which is rotatably supported between the side boards of a reel body; in which, according to the invention, a drive shaft of the level winding deice which is adapted to reciprocate a fishing line guide section of a level winding device right and left, and is turned in association with a handle is provided between the side boards of the reel body together with a handle shaft to which the handle is coupled, in such a manner that the drive shaft is located at the rear of the spool.

The drive shaft of the level winding device is employed as the handle shaft, and is provided at the rear of the spool; that is, the handle shaft is located near the body of the angler, and therefore the angler can turn the handle with ease. Furthermore, this feature results in an advantage that the length of the reel body in a direction perpendicular to the spool shaft is reduced; that is, the reel body is miniaturized as much.

DETAILED DESCRIPTION OF THE PREFERRED EMBODIMENT

A preferred embodiment of the invention will be described with reference to the accompanying drawings.

Figure 1:
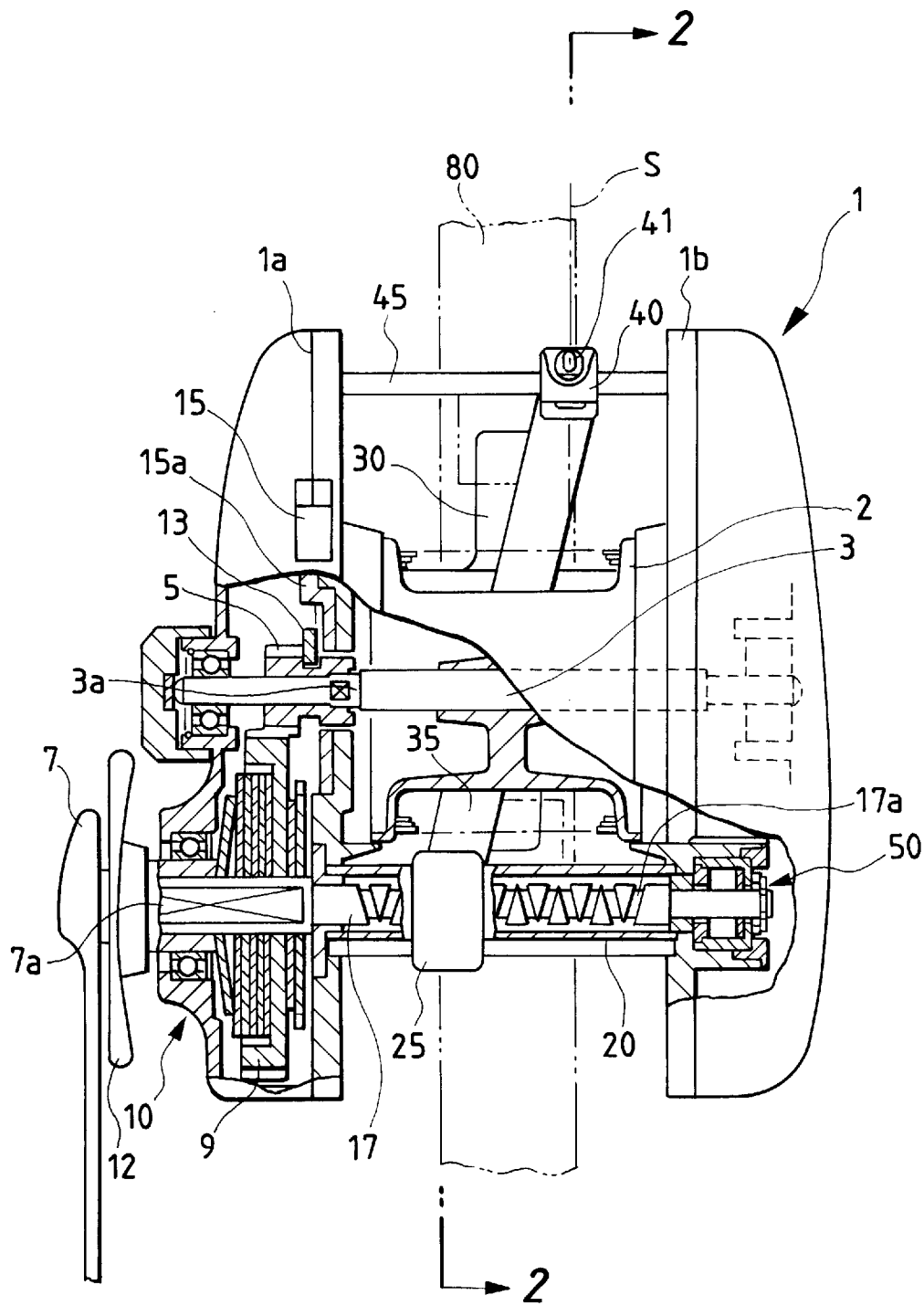
FIG. 1 is a plan view, with parts cut away, showing a double-bearing type fishing reel, which constitutes a preferred embodiment of the invention.
Figure 2:
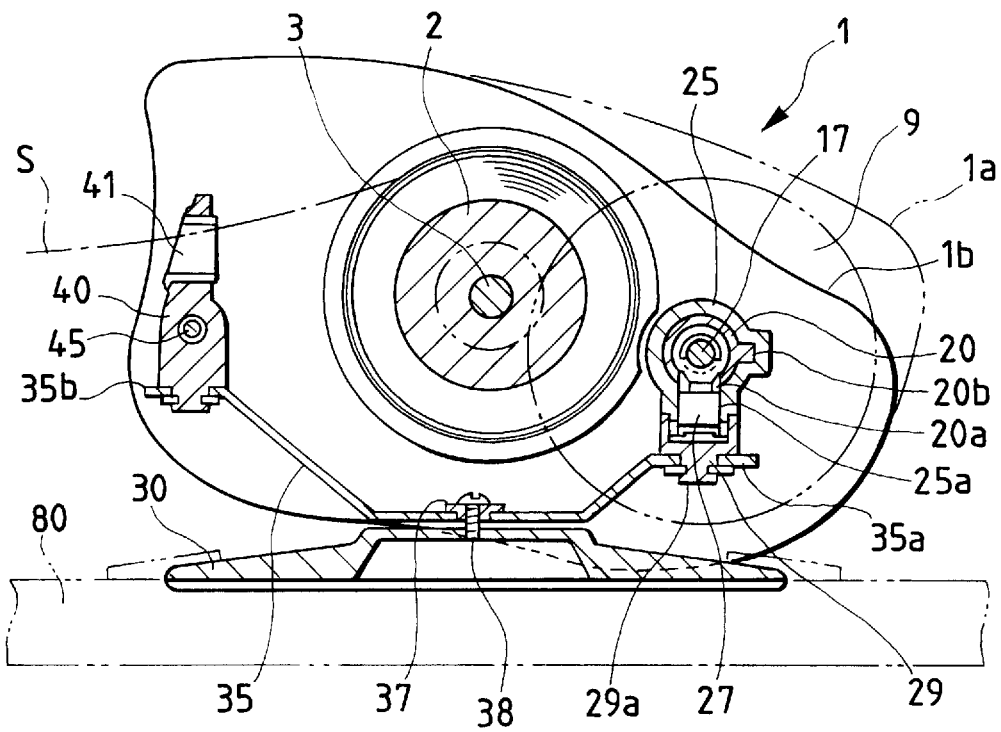
FIG. 2 is a sectional view taken along line the 2—2 in FIG. 1.

FIG. 1 is a plan view of a double-bearing type fishing reel, the embodiment of the invention, and FIG. 2 is a sectional view taken along the line 2—2 in FIG. 1.

In those figures, reference numeral 1 designates a reel body, and 3, a spool shaft on which a spool 2 is mounted. The spool shaft 3 is rotatably supported between the right and left side boards 1b and 1a of the reel body 1. A pinion 5 is mounted on one end portion of the spool shaft 3 in such a manner that it is axially slidable. The pinion 5 is engaged with a drive gear 9 which is mounted on the drive shaft 7a of a handle 7 (hereinafter referred to as "a handle shaft 7a", when applicable). Hence, as the handle 7 is turned, the rotation of the handle 7 is transmitted through the drive gear 9 and the pinion 5 to the spool 2 to turn the spool 2. A drag mechanism 10 including drag washers and drag spring washers is arranged between the handle shaft 7a and the drive gear 9, and a star drag 12 is provided adjacent to the handle 7, to adjust the drag force.

The pinion 5 has an annular groove, with which a clutch board 13 is engaged. The clutch board 13 is axially slid by a swingable cam 15a, which is swung with a clutch change-over lever 15 which is protruded from the surface of the side board 1a, so that the pinion 5 is axially slid. FIG. 1 shows a state of the pinion 5 which is engaged with an engaging portion 3a of the spool shaft 3. Under this condition, the torque of the handle 7 is transmitted through the above-described clutch means to the spool 2 ("clutch on"). On the other hand, when the clutch change-over lever 15 is operated to disengage the pinion 5 from the engaging portion 3a of the spool shaft 3, the spool 2 becomes freely rotatable ("clutch off"). The clutch means is not limited only to that which has been described above; that is, it may be modified or changed in various manners so that the change-over operation is smoothly carried out to transmit the drive force of the handle to the spool 2, and to make the spool 2 freely rotatable.

The drive shaft 17 of the level winding device (hereinafter referred to as "a traverse shaft 17", when applicable), which has a traverse groove 17a in its outer cylindrical surface, is rotatably supported between the rear portions of the right and left side board 1b and 1a as viewed in the direction in which the fishing line is let out of the spool 2 (hereinafter referred to as "a fishing-line let-out direction", when applicable). The traverse shaft 17 is coaxial with the above-described handle shaft 7a, and it is turned as the handle shaft 7a is turned with the handle 7. The traverse shaft 17 is accommodated in a guide cylinder 20 which is supported between the right and left side boards 1b and 1a and has an elongated hole 20 in the bottom which is extended axially. The traverse shaft 17 is rotated in the guide cylinder 20.

The guide cylinder 20 has a protrusion 20b on its outer cylindrical surface in such a manner that the protrusion 20b is extended axially. And a driver 25 is provided in such a manner as to surround the outer cylindrical surface and the protrusion 20b of the guide cylinder 20. The protrusion 20b is adapted to prevent the rotation of the driver 25 when the driver 25 is reciprocated along the guide cylinder 20. The lower portion of the driver 25 is formed into a protruded accommodating section 25a, which accommodates an engaging piece 27 which is engaged with the traverse groove 17a through the elongated hole 20a formed in the guide cylinder 20. The accommodating section 25a has a threaded groove in the outer cylindrical surface, which is threadably engaged with a cap nut 29. The cap nut 29 includes a coupling portion 29a which is extended downwardly. The coupling portion 29a is fixedly engaged with an operating body (described later).

A rod mounting member 30, which is used for mounting the reel body 1 on a fishing rod 80, is provided below the spool 3, between the right and left side boards 1b and 1a. As shown in FIG. 2, the central portion of a bend-plate-shaped operating body 35 is supported on the surface of the rod mounting member 30 with the aid of a collar 37 and a supporting shaft 38 arranged in the collar 37, so that the operating body 35 is swingable through a predetermined angle about the supporting shaft. The operating body 35 has an elongated hole 35a in one end portion with which the coupling portion 29a of the cap nut 29 is engaged in such a manner that the coupling portion 29a is prevented from coming off the operating-body 35. Furthermore, the operating body 35 has a fishing line guide body 40 having a fishing line guide hole 41 through which the fishing line wound on the spool 3 is extended. The fishing line guide body 40 is to guide the fishing line right and left so that the fishing line S is wound parallelly on the spool 2. In order to stably move the fishing line guide body right and left, it is preferable that the fishing line guide body is supported by a guide shaft 45 which is connected between the right and left side boards 1b and 1a. In this connection, the fishing line guide body 40 is engaged with an elongated hole 35b formed in the other end portion of the operating body 35 in such a manner that the fishing line guide body 40 is prevented from coming off the operating body 35.

The above-described handle shaft 7a has a reverse rotation preventing device, so that the handle 7 can be turned in the-fishing-line take-up direction. In the embodiment, the reverse rotation preventing device is a rolling type one-way clutch. The rolling type one-way clutch may be provided on the side board where the handle 7 is arranged, or on the other side board. As was described above, the handle shaft 7a is integral with the traverser shaft 17. Hence, in the embodiment, the rolling type one-way clutch 50 is provided on a part of the traverse shaft 17 which is in the right side board 1b. That is, the rolling type one-way clutch 50 is provided in the right side board 1b which is opposite to the left side board 1a where the handle 7 is provided. This feature makes it possible to disperse arrangement spaces, and to effectively utilize the limited spaces, thereby to miniaturize the reel itself.

When the handle 7 is turned to take up the fishing line, the fishing reel constructed as described above operates as follows: That is, the spool 2 is turned with the aid of the drive gear 9 coupled to the handle shaft 7a and the pinion, to take up the fishing line. As the handle shaft 7a is turned, the traverse shaft 17 is also turned. The traverse groove 17a is engaged with the engaging piece 27, so that, as the traverse shaft 17 is turned, the driver 25 with the engaging piece 27 is reciprocated along the guide cylinder 20. In this operation, the driver 25 is reciprocated along the guide cylinder 20, but not rotated because of the protrusion 20b formed on the guide cylinder 20. As the driver 25 is reciprocated in this manner, the operating body 35 is swung between the two side walls 1a and 1b. In this case, the rear end portion of the operating body 35 tends to turn arcuately; however, it is linearly reciprocated along the traverse shaft 15 because the coupling portion 29a is moved in the elongated hole 35a formed in the operating body 35.

As the operating body 35 swings about the supporting shaft 38, the fishing line guide body is reciprocated right and left in front of the spool 2. Hence, in winding the fishing line on the spool 2, the fishing line guide body 40 is reciprocated along the spool shaft 3 in front of the spool 2, whereby the fishing line S is uniformly wound on the spool 2.

As was described above, in the fishing reel, the handle shaft 7a integral with the traverse shaft 17 is arranged at the rear of the spool shaft 3; that is, between the rear portions of the right and left side boards as viewed in the fishing-line let-out direction. Hence, the position of the handle 7 comes near the body of the angler. As a result, in turning the handle, the angler can hold his arm tight, and therefore he can perform the fishing line winding operation stably. Furthermore, the reel body 1 is reduced in the amount of protrusion in the fishing-line let-out direction, and therefore the reel body 1 is miniaturized as a whole. Thus, the fishing reel is high in portability and in operability.

As shown in FIG. 2, the side board (the right side board 1b in the embodiment) which is opposite to the side board provided with the handle 7, may be so modified that it is different in configuration from the side board (1a) provided with the handle. More specifically, the rear portion of the right side board 1b may be made tapered more than the rear end portion of the left side board 1a. In this case, the angler can hold the reel body sufficiently deeply; that is, the fishing reel is improved in operability. It goes without saying that, the right and left side boards may be similar to each other as in the case of the conventional fishing reel.

Figure 3:
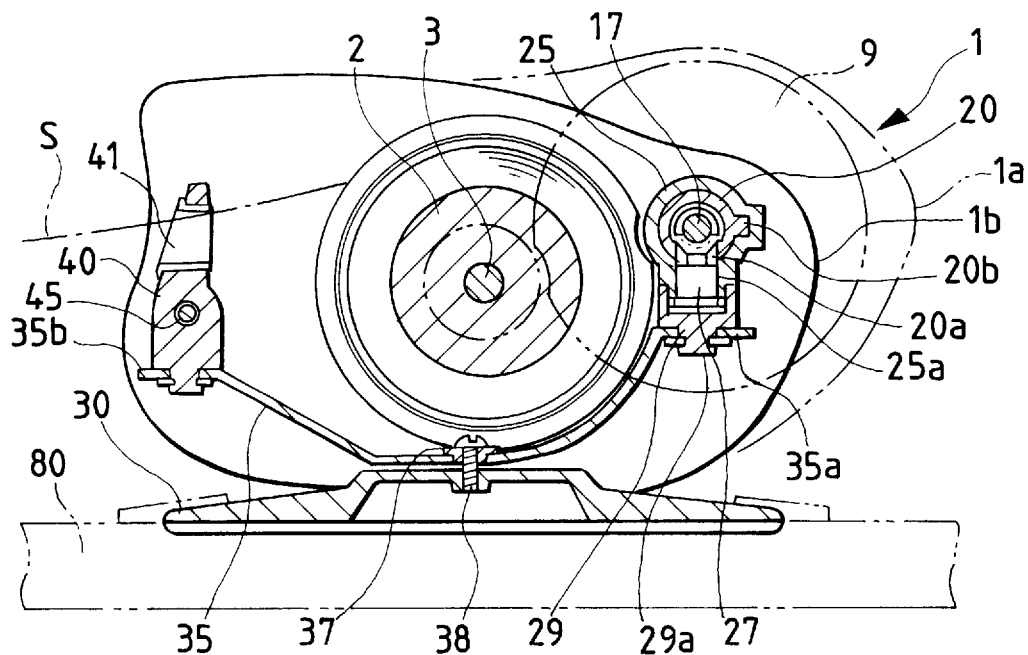
FIG. 3 is a sectional view showing one modification of the double-bearing type fishing reel according to the invention.

While the invention has been described in connection with its preferred embodiment, the invention is not limited thereto or thereby; that is, it will be obvious to those skilled in the art that various changes and modifications may be made therein without departing from the invention. For instance, as shown in FIG. 3, the handle shaft 7a (and accordingly the traverse shaft 17) may be arranged higher in position than in the case of in FIG. 2. That is, the position of the handle shaft 7a (and accordingly the traverse shaft 17) may be changed to allow the angler to positively hold the reel body 1.

As was described above, in the double-bearing type fishing reel of the invention, the handle shaft is arranged between the right and left side boards in such a manner it is located behind the spool shaft and is coaxial with the traverse shaft adapted to move the fishing line guide body. Hence, with the fishing reel, the handle comes near the body of the angler. Accordingly, in turning the handle, the angler can hold his arm tight; that is, he can rotate the handle stably. Furthermore, since the traverse shaft is coaxial with the handle shaft, the reel body is reduced in the amount of protrusion in the fishing-line let-out direction, and therefore the reel body 1 is miniaturized as a whole. Thus, the double-bearing type fishing reel of the invention is high in portability and in operability.

What is claimed is:

1. A double-bearing fishing reel with a level winding device comprising a spool rotatably supported between side boards of a reel body, said level winding device having a drive shaft supported between said side boards of said reel body and located rearwardly of said spool, said drive shaft mounting a handle thereon for reciprocating a fishing line guide section of said level winding device right and left in association with rotation of said handle.

2. A double-bearing fishing reel according to claim 1, further comprising a reverse rotation preventing device mounted on a portion of said drive shaft located at one of said side boards, wherein said reverse rotation device cooperates with said drive shaft to prevent reverse rotation of said handle.

3. A double-bearing fishing reel according to claim 2, wherein said reverse rotation preventing device is a one-way clutch.

4. A double-bearing fishing reel according to claim 1, wherein said drive shaft is located opposite from said fishing line guide section with respect to said spool.

5. A double-bearing fishing reel according to claim 1, wherein said drive shaft and said handle are positioned rearwardly and upwardly relative to a shaft of said spool.

6. A double-bearing fishing reel with a level winding device, comprising:

- a spool rotatable supported between side boards of a reel body;
- said level winding device having a drive shaft supported to said side boards of said reel body and located rearwardly of said spool;
- said drive shaft mounting a handle thereon for reciprocating a fishing line guide section of said level winding device right and left in association with rotation of said handle; and
- a traverse cam groove formed on said drive shaft.

7. A double-bearing fishing reel, comprising:

- a spool rotatable supported between side boards of a reel body;
- said level winding device having a drive shaft supported to said side boards of said reel body and located rearwardly of said spool;
- said drive shaft mounting a handle thereon for reciprocating a fishing line guide section of said level winding device right and left in association with rotation of said handle; and
- an operating body engaged with said fishing line guide section and said drive shaft for reciprocating said fishing line guide body right and left in front of said spool upon rotation of said drive shaft, said operating body having a pivot member located downwardly from said spool on said reel body for pivoting said operating body between said side boards.

8. A double-bearing fishing reel, comprising:

- a level winding device;
- a reel body having a pair of side boards;
- a spool rotatably supported between said side boards of said reel body;
- said level winding device having a drive shaft located behind said spool and supported between said side boards wherein a fishing line enters said reel body in front of said spool and having a fishing line guide section located in front of said spool for guiding the fishing line onto said spool; and
- a handle mounted on said drive shaft for rotating said spool and said drive shaft,
- wherein said fishing line guide section swings between said side boards for guiding the fishing line uniformly on said spool in a parallel direction.

* * * * *